US010902183B2

(12) United States Patent
Maksak et al.

(10) Patent No.: US 10,902,183 B2
(45) Date of Patent: Jan. 26, 2021

(54) AUTOMATED TAGGING OF TEXT

(71) Applicant: Digital Genius Limited, London (GB)

(72) Inventors: Bohdan Maksak, London (GB); Conan McMurtrie, London (GB); Jose Marcos Rodriguez Fernandez, London (GB); Mahyar Bordbar, London (GB); Yoram Bachrach, London (GB)

(73) Assignee: DIGITAL GENIUS LIMITED, London (GB)

( * ) Notice: Subject to any disclaimer, the term of this patent is extended or adjusted under 35 U.S.C. 154(b) by 187 days.

(21) Appl. No.: 15/873,642

(22) Filed: Jan. 17, 2018

(65) Prior Publication Data

US 2018/0300295 A1 Oct. 18, 2018

(30) Foreign Application Priority Data

Apr. 14, 2017 (GB) .................................. 1706047.6

(51) Int. Cl.
| | |
|---|---|
| *G06F 40/117* | (2020.01) |
| *G06N 3/04* | (2006.01) |
| *G06F 16/93* | (2019.01) |
| *G06N 3/08* | (2006.01) |
| *G06N 7/00* | (2006.01) |
| *G06F 16/31* | (2019.01) |

(52) U.S. Cl.
CPC .......... *G06F 40/117* (2020.01); *G06F 16/313* (2019.01); *G06F 16/93* (2019.01); *G06N 3/04* (2013.01); *G06N 3/0445* (2013.01); *G06N 3/0454* (2013.01); *G06N 3/08* (2013.01); *G06N 7/005* (2013.01)

(58) Field of Classification Search
CPC ...... G06F 40/117; G06F 16/93; G06F 16/313; G06N 3/04; G06N 3/0445; G06N 3/0454; G06N 3/08; G06N 7/005
See application file for complete search history.

(56) References Cited

U.S. PATENT DOCUMENTS

| | | | | |
|---|---|---|---|---|
| 10,121,467 | B1* | 11/2018 | Gandhe | ................ G06F 40/284 |
| 2001/0019629 | A1* | 9/2001 | Navoni | ................ G11C 15/046 |
| | | | | 382/229 |
| 2006/0020607 | A1* | 1/2006 | Patterson | .............. G06F 16/313 |

(Continued)

*Primary Examiner* — Jay A Morrison
*Assistant Examiner* — Antonio J Caiado
(74) *Attorney, Agent, or Firm* — Timothy E. Siegel Patent Law, PLLC; Timothy E. Siegel

(57) ABSTRACT

A computer-implemented method of tagging a text, comprises: determining a value for each of a plurality of locations in a first vector; processing (402), by a trained first neural network component, the first vector to generate a second vector; processing (404), at a trained second neural network component, the second vector to generate a probability score for each of at least ten predetermined tags; determining (406) if each probability score meets a criterion; if the criterion is met, assigning (408) the tag corresponding to the probability score to the text. Each of the locations may correspond to a respective predetermined word, each value relating to existence and/or frequency of the corresponding word in the text, and the number of locations may be between 600 and 20000. The number of locations in the second vector may be fewer than the number of locations in the first vector and is from 100 to 5000.

20 Claims, 5 Drawing Sheets

(56) References Cited

U.S. PATENT DOCUMENTS

| | | | |
|---|---|---|---|
| 2015/0127327 A1* | 5/2015 | Bacchiani | G10L 25/30 |
| | | | 704/202 |
| 2015/0154285 A1* | 6/2015 | Saarinen | H04M 1/72569 |
| | | | 707/749 |
| 2016/0085860 A1* | 3/2016 | Wallenberg | G06F 16/73 |
| | | | 707/706 |
| 2017/0270919 A1* | 9/2017 | Parthasarathi | G10L 15/02 |
| 2017/0372696 A1* | 12/2017 | Lee | G10L 15/16 |
| 2018/0005112 A1* | 1/2018 | Iso-Sipila | G06N 3/0445 |
| 2018/0032801 A1* | 2/2018 | Gur | G06K 9/4628 |
| 2018/0144052 A1* | 5/2018 | Sayyadi-Harikandehei | |
| | | | G06F 7/026 |
| 2019/0122096 A1* | 4/2019 | Husain | G06N 3/04 |

* cited by examiner

AUTOMATED TAGGING OF TEXT

FIELD OF THE INVENTION

The present invention relates to a method of automated tagging of text, such that tags are relevant to the text. The present invention also relates to a related system and computer program.

BACKGROUND

An ability to quickly search amongst stored texts for relevant texts is desirable in many situations. For example, a customer service agent who has to respond to a received message may want to respond to that message quickly, but would like to check a history of interactions with a customer before responding to ensure that the response is correct. Messages may relate to diverse subjects, for example, where the agent works for an airline, booking or cancelling of flights, requesting of refunds, or in connection with lost luggage. The agent may also wish to check if promises have been made to a customer or that relevant discounts have been offered or given to a customer.

Reading the entire history of customer interactions is inefficient and time consuming. However, having historical information available to the agent may help the agent. Where agents cannot read an entire case history, they have to be selective in what they read before responding to a customer, so a search tool that allows them to quickly identify messages relating to a relevant issue or current customer would be helpful.

An agent may also wish to review how other agents have responded to similar queries. A search tool is also useful in this instance. Generally, enabling good searching enables agents to handle a high load of customers and respond to customers quickly and accurately.

In order to carry out searching, each message, note or other document in a system may be tagged with a set of keywords which are indicative of the issues discussed therein. In the case of a message, the keywords form a concise summary of the message, allowing agents to quickly determine what was discussed without having to read the entire message. Tagging messages with keywords may also allow for more efficient routing of a message to the appropriate agent. For example, if a customer message is marked with a keyword "booking", it may be routed to an agent who handles bookings, rather than an agent who handles complaints. Further, automated search engines could highlight relevant messages based on keyword tags.

Another example where tags are used to allow efficient search is in social networks such as Twitter. Twitter uses tags (known as "hashtags") associated with messages. These tags allow users to add keywords to messages they post, thereby highlighting the topic that has been discussed and allowing future searches to retrieve these messages.

Although tags are a very useful way of summarizing messages for future examination and search, users typically have to manually annotate messages with these keywords. For example, after responding to a customer request in a customer relationship management (CRM) tool, agents need to list the relevant keywords in a tool. Similarly, users may have to list tags relating to their message in online social networks. The process of supplying the relevant tags or keywords is herein referred to as "annotation effort".

Annotation effort is time consuming and prone to errors. If the annotator thoroughly examines the message, they spend a lot of time on the annotation, which means they spend less time responding to customers. On the other hand, if the annotator does not spend enough time on the annotation they may miss important keywords, making it harder to find the message in the future. It is also possible that an incorrect tag may be added so the message would come up in future searches when it is not relevant.

An object of the present invention is to solve at least some of the problems of the prior art. For example, the present invention attempts to solve the problems associated with accurately and efficiently tagging messages or text in any environment.

SUMMARY OF THE INVENTION

One way of automating tagging is to determine keywords by treating each possible keyword as a standard classification problem. Given a possible keyword k, the historical texts $H=\{h_1, h_2, \ldots h_q\}$ can be examined and partitioned into positive instances which were tagged with the keyword $$k \in K, P_k = \{h \in H | k \in K(h)\}$$

where K is a set of all possible keywords, and negative instances which were not tagged with that keyword $$N_k = \{h \in H | k \notin K(h)\}.$$

A classifier $C_k$ can be trained which would take a previously unseen text n and predict whether the keyword k is relevant to this text. The classifier $C_k$ is a binary classifier that takes an input text and outputs 1 if the keyword k is predicted to be relevant to the text and 0 otherwise.

There are many text classifiers, for example based on simple logistic regression, support vector machines and neural networks. The runtime and memory consumption of the classifier depends on the method used. However, determining whether many tags are relevant to a given document would require training many binary classifiers, one for each keyword of interest, then applying all of them. More precisely, using such an approach training would take place on $|K|=z$ classifiers, $C_1, \ldots, C_z$ (where the classifier for keyword $k_i$ is trained using the partition $P_{ki}, N_{ki}$ and for a new input text n the set of all matching keywords $\{k \in K | C_k(n)=1\}$ is returned.

While this approach is simple, it is potentially inefficient in terms of use of computational and memory resources. If the runtime of a single classifier is c, the runtime for determining all the relevant tags is c·z. Further, many classification approaches require a lot of memory for their parameters (for example, deep neural networks are likely to require many parameters to obtain a good performance). Although it is possible to store a model's parameters on secondary storage, such as a hard drive, and load them in to the memory whilst the classifier is running, the process of loading the parameters from the secondary storage to the memory is time consuming as disk access may be slow. It is thus desirable to keep all the model parameters in the local memory. While caching the parameters of a single classifier in memory is not likely to cause memory problems, in this simple approach there are r classifiers. If a single classifier requires m bytes in memory, storing the parameters for all the models requires m·z bytes, which may not be manageable due to memory constraints.

The above mentioned simple approach may be wasteful when the tags are correlated or related in some other way. In an example, where the tag $k_b$ is well correlated with the tag $k_a$; i.e. if $k_b$ is used almost any time when the tag $k_a$ is applicable, and almost never used when $k_a$ is not applicable it would be possible to build only the classifier for $k_a$ and apply $k_b$ if and only if $k_a$ is applicable.

Even in cases where there is a high but not perfect correlation between tags, it may be the case where both tags rely on similar information. For example, tags $k_a$ and $k_b$ may only be applicable when dealing with a specific client issue. In this case, there is no point trying to infer this intermediate information multiple times, as the simple approach would do.

An aim of the present invention aim is to infer a specific set of tags for a body of text rather than reconstructing an original message. If a customer wrote "I am contacting you because I cannot access the system online to make a payment. This is the third time I am writing to complain about your service, and if these problems occur again I will probably cancel my subscription": a general compression algorithm or a dimensionality reduction method could store a concise description of the original message. This would entail an attempt to store as many details as possible so as to best reconstruct the entire original message (including details that may not be of interest when trying to determine the most relevant tags from the list of keywords). This could be costly in terms of storage space and operator time.

Another aim of the present invention is not to compress the original text into a concise description so that the text can later be reconstructed (exactly or approximately) as is known from prior art methods. This is due to the fact that there may be multiple solutions which exploit various correlations so as to compress texts into a short description vector, which is clearly undesirable. Possible variations of this include compression methods that allow exactly reconstructing the original message, or methods that rely on various forms of dimensionality reduction that only allow reconstruction of the original message approximately.

According to a first aspect of the present invention there is provided a method of tagging a text, comprising: determining a value for each of a plurality of locations in a first array, wherein each of the locations corresponds to a respective predetermined word, each value relates to relevance of the corresponding word in the text; processing, by a trained first neural network component, the first vector to generate a second vector, wherein the number of locations in the second vector is fewer than the number of locations in the first vector; processing, at a trained second neural network component, the second vector to generate a probability score for each of a plurality of predetermined tags; determining if each probability score meets a criterion; if the criterion is met, assigning the tag corresponding to the probability score to the text. The number of words may be between 600 and 20000. The number of locations in the second vector is preferably from 100 to 5000. The number of predetermined tags is preferably at least ten.

By generating the second vector which is shorter than the first vector, the text can be accurately tagged while keeping the required memory and load low. In particular, an advantage over other approaches based on building a classifier per each tag is that it can achieve the same accuracy with a much lower runtime complexity and memory consumption, as it is capable of exploiting correlations between the keywords and leveraging the fact that the multiple tags may be predicted using the same information. Information retained in the second vector is not for reconstruction of the text as a compression method may enable, but allows correct tags to be predicted. Only information pertaining to the tags is wanted to be retained.

The relevance of each of the words may be based on the existence and/or the frequency of the predetermined word in the text to be tagged. The method may include providing the first vector to the first neural network component.

Determining the value for each location in the first vector may be based on frequency of the predetermined word and a total number of words in the text.

The predetermined words may comprise words used in texts related to a same field as the text to be tagged. In this case the predetermined words may be the most frequent of the related texts in the same field.

The number of tags for which the probability score may be determined is at least 20.

The method of any one of the preceding claims, wherein the number of locations of the first array is preferably 2000 and 5000. The number of locations of the second array is from 100 to 5000.

The first and second neural network component each comprise an input layer, an output layer, and one or more hidden layers between the input layer and output layer. The one, more or all of the input layer, the output layer, and the one, or more hidden layers may comprise a feedforward layer. The one, more or all of the input layers, the output layer and the one or more hidden layers may comprise a recurrent neural network (RNN) component or layer (for example with one or more LSTM or GRU components).

The threshold may be different for at least two of the tags.

According to a second aspect of the present invention, there is provided a computer program product comprising computer program code, stored on a computer readable storage means, which, when run on a processing unit, causes the processing unit to: determine a value for each of a plurality of locations in a first vector, wherein each of the locations corresponds to a respective predetermined word, each value relates to relevance of the corresponding word in the text; processing, by a trained first neural network component, the first vector to generate a second vector, wherein the number of locations in the second vector is fewer than the number of locations in the first vector; processing, at a trained second neural network component, the second vector to generate a probability score for each of a plurality of predetermined tags; determine if each probability score meets a criterion; if the criterion is met, assign the tag corresponding to the probability score to the text.

According to a second aspect of the present invention, there is provided a system for predicting tags for a text, the system comprising: a processing unit; a computer-readable storage medium having a computer program comprising code stored thereon, and operably coupled to the processing unit, wherein the processing unit, with the storage medium and the code, are configured to: determine a value for each of a plurality of locations in a first vector, wherein each of the locations corresponds to a respective predetermined word, each value relates to relevance of the corresponding word in the text; processing, by a trained first neural network component, the first vector to generate a second vector, wherein the number of locations in the second vector is fewer than the number of locations in the first vector; processing, at a trained second neural network component, the second vector to generate a probability score for each of a plurality of predetermined tags; determine if each probability score meets a criterion; if the criterion is met, assign the tag corresponding to the probability score to the text.

BRIEF DESCRIPTION OF FIGURES

Embodiments of the present invention will now be described, by way of example only, in relation to the accompanying drawings in which.

DETAILED DESCRIPTION OF EMBODIMENTS

Embodiments of the present invention relate to automatically summarizing an input text by determining relevant tags from a plurality of predetermined tags, using a system including a trained neural network. In the embodiments to be described, the tags are in the form of keywords, although this is not necessarily the case; other kinds of tag, such as images or colors, may be assigned.

The neural network has an encoder, for reducing a first vector in the form of a text representation vector, which contains information about relevance of word, for example their existence and/or frequency, in the input text, to a second vector, referred to herein as the "short description vector", such that information is retained relating to likelihood that the predetermined keywords are relevant to the input text. The neural network also has a decoder for generating an output vector, using the short description vector, for use in generating a probability score for each of the keywords that is indicative of whether the respective keyword is relevant to the text. If the keyword is relevant, the input text is then tagged with the keyword.

The input text may be in the form of a message text or text of a group of messages. Such a group of messages may be a conversation. Embodiments are not limited to the input text being any particular kind of message or conversation, provided the words in the message or conversation are machine readable. For example, the messages may be any one or more of SMS (short message service) messages, emails, instant messaging service messages, messages sent over online social networking services such as Twitter®, and messages submitted using an online form provided in a web browser. The messages may be received and/or sent messages. Groups of messages may be sent between two or more entities. Such entities may include people, or computerised agents configured to generate messages automatically. Messages may relate to voice conversation that has been transcribed in a prior step, or be handwritten text that has been processed in a prior step. Alternatively, the input text may be notes made by a human, news articles or other.

Herein, vectors are referred to. As will be appreciated, a vector has a dimension and a number of defined positions or locations corresponding to its width or length. As will also be understood, a vector is represented by a one-dimensional array. These terms should be construed accordingly.

Figure 1:
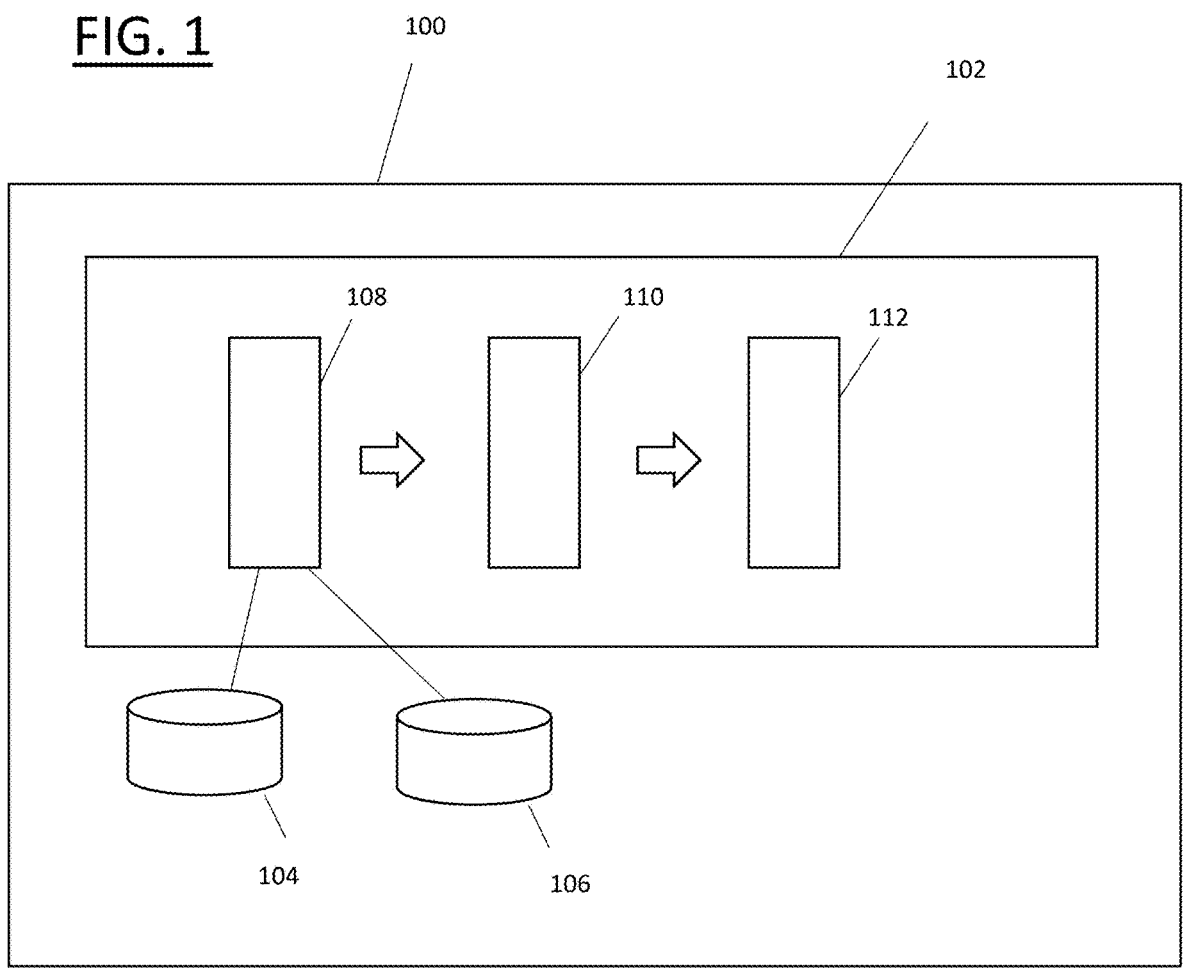
FIG. 1 is the simplified block diagram of the system in accordance with an embodiment of the present invention.

Referring to FIG. 1, a system 100 comprises a text tagging engine 102, a text store 104 and a vocabulary store 106. The text tagging engine 102 is configured to process input texts, to determine, for each input text, a probability score for each of a plurality of predetermined keywords indicative of whether the particular keyword is applicable to the text, and, if one of the probability scores exceeds a threshold score, to assign the keyword to the text. The text tagging engine 102 has several functional layers, including a text preparation layer 108, a network layer 110, and a keyword assignment layer 112. As will be appreciated by the skilled person, these functional layers are implemented as one or more computer programs typically comprising one or more modules.

The text store 104 stores the input texts. Those of the texts that have been processed by the text tagging engine 102 have keywords associated with them. Those that have not are queued for processing by the text tagging engine 102. The text store 104 may store other data relating to the texts. For example, where each text is a message, an identifier of the sender, and dates and times of receiving and sending of message, et cetera.

The vocabulary store 106 stores a word list. The words in the word list are predetermined. They are the number w of words most frequently used in a corpus of historical texts. The word list is generated using a counting algorithm that has processed the corpus to determine the number of each word in the corpus.

The word list may be referred to as the "vocabulary" $V=\{w_1, w_2, \ldots, w_w\}$. In variant embodiments, the word list is not based on a corpus of historical texts; for example the word list may have been generated using other texts, for example that are not historical texts but relate to similar subject matter. Whether the corpus of historical texts is used or other texts, such texts may first be parsed to remove words and punctuation that do not contribute to describing and identifying keywords.

The text preparation layer 108 is configured to generate a text representation vector for each input text, where the text representation vector is for input to the network layer 110. The vector has w locations corresponding to the number of words in the list. Each word maps to a respective location in the word representation vector.

The network layer 110 is configured to receive the text representation vector from the text preparation layer 108 and to generate a probability score for each of the predetermined keywords.

Figure 2:
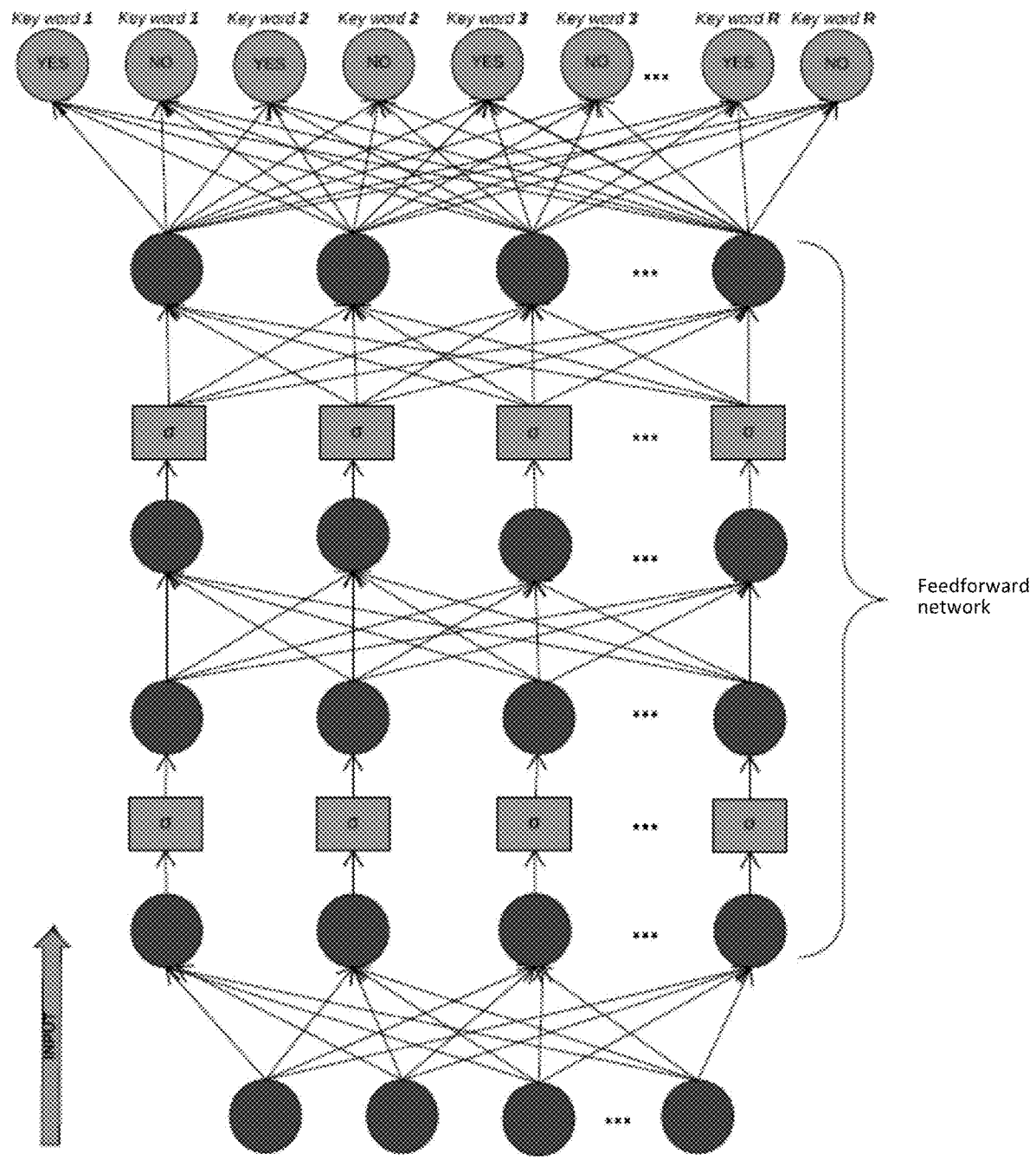
FIG. 2 is a diagram of an encoder for use in the system in accordance with the embodiment.
Figure 3:
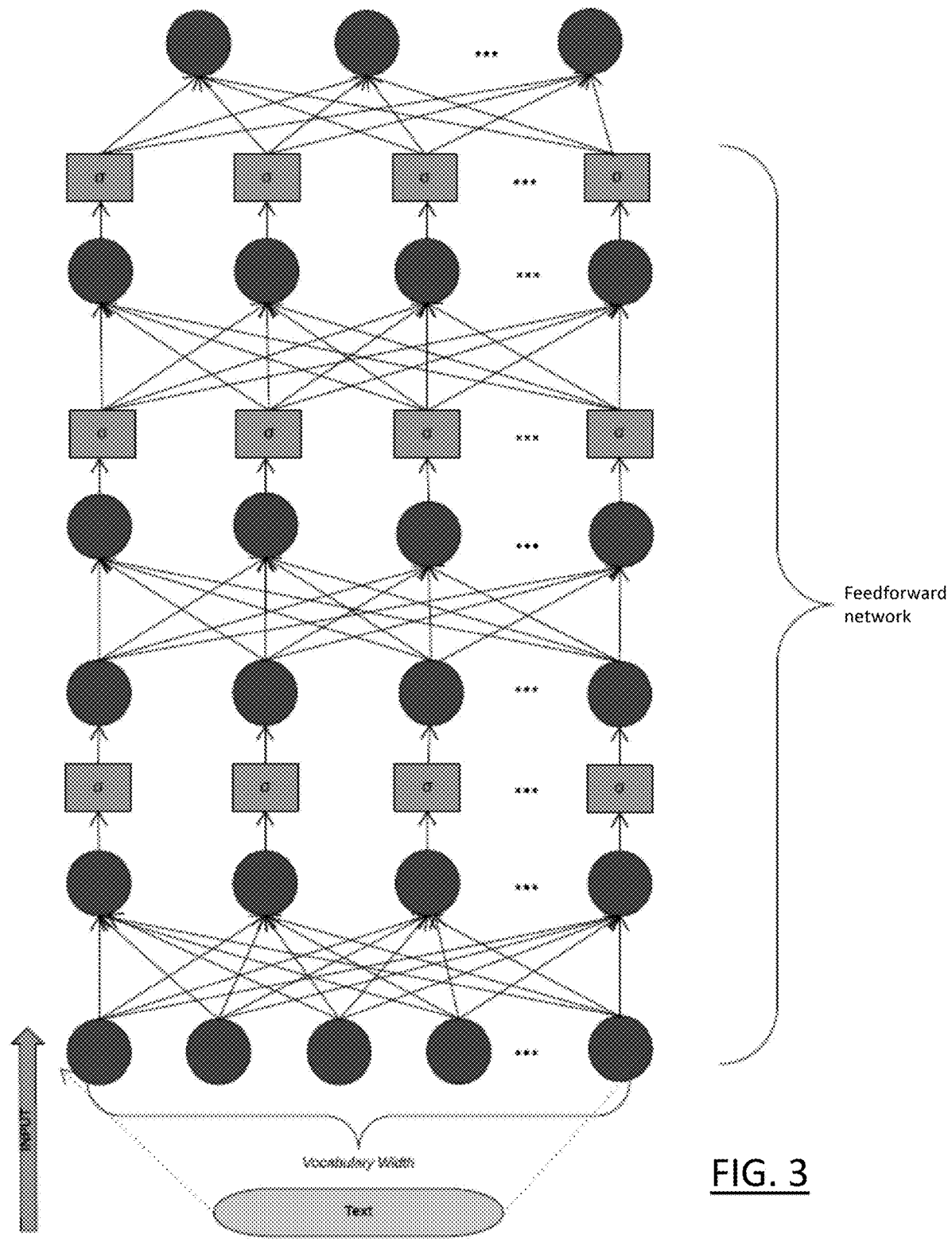
FIG. 3 is a diagram of a decoder for use in the system in accordance with the embodiment.

The network layer 110 includes the two neural network parts, namely the encoder, shown illustratively in FIG. 2, and the decoder, shown illustratively in FIG. 3. The encoder and the decoder are trained together before being used to generate the probability scores.

The keyword assignment layer 112 is configured to determine keywords that are relevant to the input text based on the probability scores, and to assign those keywords to the text.

Figure 4:
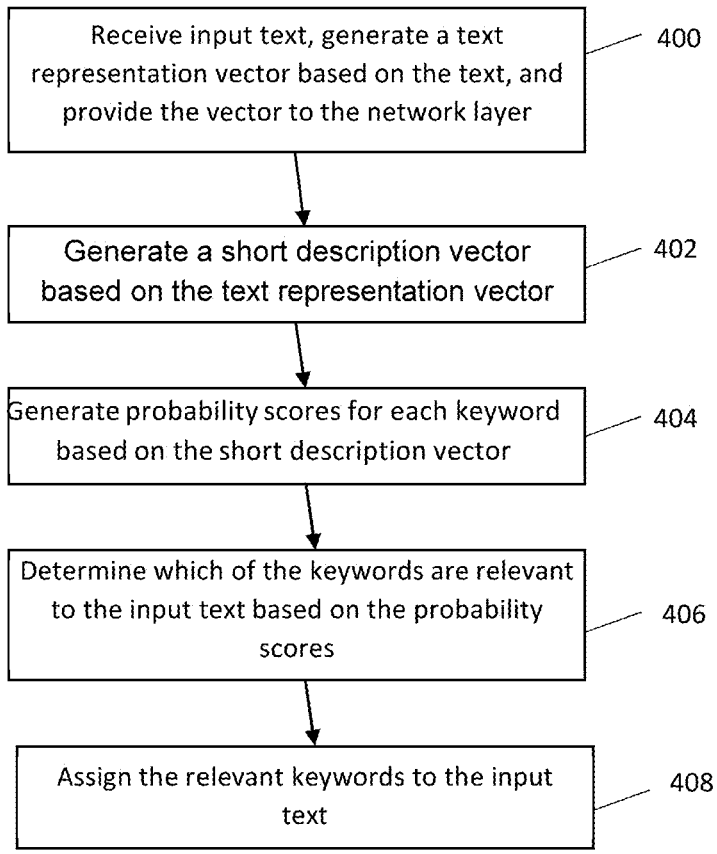
FIG. 4 is a flow diagram indicating steps in accordance with embodiments of the invention.
Figure 5:
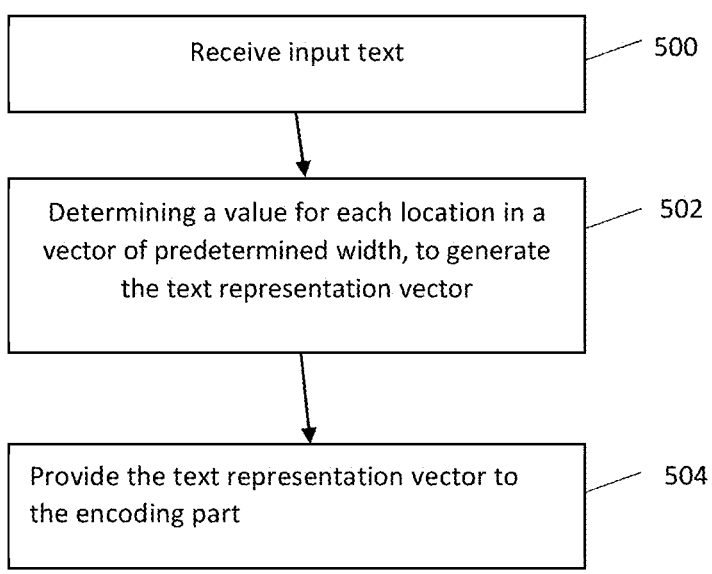
FIG. 5 is a flow diagram of steps involved in generating a text representation vector.

Steps in the process of determining keywords relevant to an input text will now be described with reference to FIG. 4 and then in greater detail. First, the text preparation layer 108 receives an input text from the text store 104, generates a text representation vector using the vocabulary stored in the vocabulary store 106, and provides the text representation vector to the network layer 110 at step 400. The text representation vector is then processed at step 402 by the encoder to generate the short description vector, which is shorter than the text representation vector. The short description vector is then processed by the decoder at step 404 to generate a plurality of probability scores, each corresponding to a respective predetermined keyword. At step 406, the keyword assignment layer 112 determines which of the keywords are sufficiently relevant based on the probability scores. The keyword assignment layer 112 then assigns those keywords to the input text stored in the text store 104 at step 408.

Steps that occur in the text preparation layer 108 at step 400 will now be described in greater detail. Given a vocabulary V of w words, a text h is represented as a text representation vector of predetermined width w, where the vector is represented as:

$$r(h)=(r_1, r_2, \ldots, r_w).$$

In an embodiment, each location in the text representation vector simply indicates whether a corresponding word $w_i \in V$ appears in the text. Thus, the text representation vector is simply a vector of width w containing "1"s and "0"s. This is referred to as "binary term frequency representation" and is otherwise described as $r_i=1$ if $w_i \in h$ and otherwise $r_i=0$.

In an alternative embodiment, a term frequency (TF) representation scheme can be used to determine values for the text representation vector, in which the number of times that each of the predetermined words occurs in the input text is represented by the values in the text representation vector. In this case, $r_i=c_{h,i}$, where $c_{h,i}$ denotes the number of times that word $w_i \in V$ occurs in the text h. In another alternative embodiment, importance of words in the input text can be represented using Term Frequency/Inverse Document Frequency (TF/IDF). In another, a reweighting scheme such as Okapi BM25 may be used. Other schemes by which relevance of words in the word list to the input text, for example the existence and/or frequency of usage of each of the words represented in the text representation vector may be used. In some embodiments, there may be a prior step of parsing the text to remove punctuation and certain words that would not contribute to describing and identifying keywords, for example the words "a", "an", "the", et cetera may be removed; however by only using words with a high TF/IDF in the word list such words can also be eliminated.

The input text is received at step 500. At step 502, the input text is processed by the text preparation layer 108 to create the text representation vector. This is done by determining a value for each of the predetermined words and generating the text representation vector using those values. Where binary term representation is used, the text preparation layer 108 determines the values by searching, for each word in the list of words in the vocabulary store 104 in the text. After that word has been found, a representation of that in the form of a "1" is provided in the text representation vector, in a location in the text representation vector corresponding to the word. If the word is not found, a "0" is provided in the corresponding location. At step 504, the text representation vector is provided to the encoder.

Steps 402 and 404 are now described in greater detail with reference to FIG. 2. The encoder is configured to generate the short description vector for the input text n, that includes key information required to predict the keywords for the input text. The decoder takes the short description vector D generated by the encoder, and attempts to predict whether each of the keywords is relevant to the text, that is, the decoder outputs a probability value, for an input text n, $p_\theta(K, n)$, where the set of all possible keywords is denoted as K and the number of all possible keywords is $|K|=z$, for an input text n.

The encoder is based on a feedforward network (sometimes referred to as a "multilayer perceptron"). The encoder comprises a plurality of layers, namely an input layer, an output layer and one or more hidden layers between the input layer and the output layer. The input layer is configured to receive the word representation text and thus has a width equal to w, that is, the encoder has an input node for each location in the text representation vector. The output short description vector is denoted by $D=\{d_1, \ldots, d_m\}$, where the short description vector has a width m. The short description vector has a width that is small compared to the width of the text representation vector, so as to obtain an information bottleneck in the neural network between the encoder and the decoder.

Given the input text representation vector $(r_1, r_2, \ldots, r_w)$, the encoder includes a series of matrix multiplication with the addition of a bias, followed by a non-linear function, for example, a hyperbolic tangent (tan h) or a sigmoid function. A first biasing matrix in the series is constructed with dimensions matching the input width of w (the width of the text representation vector), and the last biasing matrix in the series is constructed with dimensions resulting in the short description vector having a width m. For example, a transformation from the input text representation is:

$$y^e = \sigma(W_3^e \sigma(W_2^e(\sigma(W_1^e r(h)+b_1^e)+b_2^e))+b_3^e)$$

where each $W_i^e$ is a matrix and where σ denotes a non-linear operation, such as $\alpha(v)=(1+e^{-v})^{-1}$ or a hyperbolic tangent operation.

Variant designs of encoder are possible. For example, the number of layers, the dimensions of hidden layers, and/or the type of non-linear function used can be changed, as will be apparent to the skilled person. Parameters of the encoder $\theta_{enc}$ are elements in the multiplying matrices ($W_1^e$, $W_2^e$, $W_3^e$ in the above example) and the bias numbers ($b_1^e, b_2^e, b_3^e$ in the above example).

The decoder receives as an input the short description vector $D=\{d_1, \ldots, d_m\}$ produced by the encoder, and outputs $|K|=2 \cdot z$ numbers, denoted as $(u_1^p, u_1^n, u_2^p, u_2^n, \ldots, u_z^p, u_z^n)$, where there are z keywords. $u_i^p$ is interpreted as the un-normalized probability that the tag $k_i$ is relevant for the input text h and $u_i^n$ as the un-normalized probability that the tag $k_i$ is not relevant for the input text h given its encoding by the encoder $D_h$.

Like the encoder, the decoder is a feedforward network consisting of a sequence of matrix multiplication with the addition of a bias followed by a non-linearity. A first matrix in a series is constructed with dimensions matching the width m of the short description vector, and the last matrix in the series is constructed with dimensions resulting in the final output vector having width $2 \cdot z$ such that there are two output numbers per keyword: one for the un-normalized probability of the tag being applicable; and one for the un-normalized probability of the tag not being applicable.

For example, a decoder transformation from the short description vector $D=\{d_1, \ldots, d_m\}$ may be:

$$y^d = \sigma_l(W_3^d \sigma(W_2^d(\sigma(W_1^d r(D)+b_1^d)+b_2^d))+b_3^d)$$

where each $W_i^d$ is a matrix and where σ and $\sigma_l$ each denote a non-linearity. As the outputs $u=(u_1^p, u_1^n, u_2^p, u_2^n \ldots u_z^p, u_z^n)$ are to be interpreted as probabilities, the range of the non-linearity $\sigma_l$ has to be $[0,1]$. An option is the logistic sigmoid:

$$\sigma_l(v)=(1+e^{-v})^{-1}.$$

The parameters of the decoder $\theta_{dec}$ are the elements in the multiplying matrices ($W_1^d, W_2^d, W_3^d$ in the above example) and the bias vectors ($b_1^d, b_2^d, b_3^d$ in the above example).

Although, in the example described above, the structure of the encoder and decoder are very similar, this does not need to be the case. For example, the encoder may have a different number of layers than the decoder, may use different types of non-linearity or may have different numbers of hidden layers. The encoder and/or decoder may include a recurrent neural network component or layer.

If any of the probability scores are greater than a predetermined threshold score, the keyword assignment layer 112 assigns the particular keywords to which the probability scores corresponds to the input text. Different threshold scores may be used in relation to different keywords. If none of the probability scores is greater than the threshold score, the keyword assignment layer 112 does not assign any keyword to the input text. In a variant embodiment, the keyword assignment layer 112 assigns the keyword having the highest associated probability score to the input text. This is so that a keyword is only automatically assigned to a text where there is an appropriately high likelihood of the correct keyword having been determined by the keyword tagging engine 102.

The number of dimensions in the vocabulary and thus in the text representation vector may typically be from 600 to 20000, or more preferably from 2000 to 5000. Stemming and lemmatization are known processing steps used in the field of natural language processing that can be used to reduce the width of the text representation vector, but use of these is not essential. The short description vector is typically of a width from 100 to 5000. The short description vector is shorter than the text representation vector, however. The number of keywords is typically from 3 to more than 1000, although typically the number is from 10 to 1000 or more typically from 20 to 1000. Where it is wanted for the number of keywords to be large, the width of the short description vector should typically be correspondingly large. Typically, the ratio of the number of keywords to the number of locations of the short description vector is from 1.1:1 to 1:20. It is noted that herein the disclosure of alternative values for the upper or lower limit of the permitted width of a vector, coupled with an indication that one of said values is more highly preferred than the other, is to be construed as an implied statement that each intermediate value of said width, lying between the more preferred and the less preferred of said alternatives, is itself preferred to said less preferred value and also to each value lying between said less preferred value and said intermediate value.

The short description vector D generated by the encoder is used to make the keyword predictions $p_\theta(k_1,n)$, $p_\theta(k_2,n) \ldots p_\theta(k_z,n)$. As a result, the dimension m of the short description vector forms an information bottleneck, which in turn forces the network to focus on the few properties of the input text that drive as many of the predictions as possible. This is based on the loss function that is used.

The system can take in a new text n and produce a prediction $p_\theta(k,n)$ regarding whether keyword k is applicable to the text n, where $p_\theta(k,n)=1$ indicates that the keyword k is predicted to be relevant to the new text n and where $p_\theta(k,n)=0$ indicates that the keyword k is predicted not to be relevant to the text n.

More precisely, the system is designed to output a set of predictions regarding all the keywords $K=\{k_1, k_2, \ldots, k_z\}$, so given a new input text n, the system outputs a vector of predictions for all the keywords, $p_\theta(K,n)=p_\theta(k_1,n)$, $p_\theta(k_2,n) \ldots p_\theta(k_z,n)$. The returned set of keywords summarizing the input text are $P(n)=\{k_i \in K | p\theta(k_i,n)=1\}$.

Embodiments of the invention may be implemented in a message handling system, for example for use by a company in communication with customers. The message handling system may be part of a customer relations system. In this case, the text may be a message received from a customer. The tags may only relate to the current issues the customer faces. Much of the information in a message is thus redundant and may not be retained in the short description vector. For example, it might not be necessary to know: the fact that the client requested assistance three times in the past, that they have a subscription and that they are so angry that they are threatening to cancel their subscription if the problems persist. The predicted list of tags may only relate to some of the issues described in the messages, rather than the whole content of the message. For example, only the required tags need to be inferred by the system for a specific client issue, in which case it may not be necessary to store any information which does not relate to the current issue. For example, tags relating to the problem a customer has, such as "payment issue", "access problem" or "security concern" may be the only things considered for tagging.

The encoder and decoder are trained together prior to input of a new text. During a training phase the system receives a set of historical texts, along with a list of keywords assigned to each historical text. The set of historical texts is denoted as:

$$H=\{h_1, h_2, \ldots h_q\}$$

Where q is the number of historical documents. The set of keywords associated with document $h_i$ is denoted as $K(h_i) \in 2^k$ (i.e. $K(h_i)$ is the set of keywords that summarize document $h_i$ in the training set).

The system is trained by processing the historical texts and generating a tagging model, that includes the parameters for the encoder and the decoder. The system processes each historical text in the same way that a new text is processed as described above, save that the output probability for each of the predetermined keywords is compared against a ground truth value for each keyword based on whether that keyword was actually relevant to that historical text. Parameters of the network are then updated to improve accuracy using a backpropagation algorithm, typically in mini batches and stochastic gradient descent mode. Once the system has been trained and a tagging model is produced, the system can then process a previously unobserved text, and output a set of keywords characterizing the new text.

In greater detail, the system examines the historical texts along with the keywords associated with each text:

$$\{K(h_i)\}q=1$$

and sets internal network parameters $\theta$.

In order to make precise keyword predictions, the parameters of the neural network $\theta=(\theta_{enc}, \theta_{dec})$ are trained so as to produce good results on the historical texts and their tags.

The historical training data consists of texts H along with correct ("ground truth") keyword labels $L(t)=l_1(t)$, $l_2(t), \ldots, l_z(t)$, where $l_i(t)=1$ if the keyword $k_i$ is relevant to the text t; and $l_i(t)=0$ if the keyword $k_i$ is not relevant to the text t.

Figure 6:
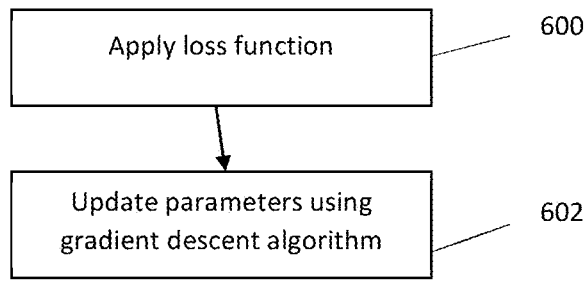
FIG. 6 is a flow diagram of steps involved in training of a neural network used in embodiments.

Referring to FIG. 6, the training engine applies a back-propagation method including calculating a gradient of a loss function at step 600 with respect to all the weights and vector positions. The loss function compares the output of a probability score distribution with an actual distribution for a historical text. The actual distribution comprises a probability of "1" (the ground truth value) for each keyword that was assigned by a human operator, and of "0" for the one or more keywords that were not assigned. The loss function is preferably a cross-entropy loss function, although it is known in the art to use other kinds of loss function in neural network training.

At step 602, the parameters of the encoder and decoder are updated using a stochastic gradient descent method. A detailed explanation of updating of the parameters is outside the scope of this description; various gradient descent optimiser methods will be known to persons skilled in the art, for example those based on stochastic gradient descent, Adam and RMSprop (Root Mean Square Propagation). Using some methods, the learning rate per-weight may be adjusted for each parameter, for example when using RMSprop. The gradient descent optimiser algorithm changes parameter gradients for the parameters of the network.

Given a loss function $L(t, u)$ measuring the performance on a given text t and the predicted probabilities (given by $u_1^p, u_1^n, u_2^p, u_2^n \ldots u_z^p, u_z^n$) for each keyword being relevant (where $u_i^p, u_i^n \in [0, 1]$ is the output from a probability model predicting the probability that keyword $k_i$ is relevant or not for the input text t) standard optimization techniques can be applied to iteratively examine the historical training data (H, L) and optimize the model parameters. H and L relate to the texts and corresponding keywords respectively for each text.

A goal of the embodiments is to achieve accurate predictions for all the keywords. In an example there are two outputs $u=(u^p, u^n)$, where $u^p$ represents the un-normalized probability of an event occurring and where $u^n$ represents the un-normalized probability of that event not occurring, and a label 1 (where if the label is positive $l^p=1$ and $l^n=0$ and where if the label is negative $l^p=0$ and $l^n=1$). If the positive probability is larger than the negative probability, i.e. $u^p > u^n$, the keyword is predicted as applying to the text, and if $u^p < u^n$ the keyword is not predicted as applying to the text.

A standard loss function for such a classifier is the categorical Softmax cross entropy loss; in a first instance a Softmax operation is applied to normalize the outputs (so they sum to 1):

$$a^p = \frac{e^{u^p}}{e^{u^p} + e^{u^n}}, a^n = \frac{e^{u^n}}{e^{u^p} + e^{u^n}}$$

The loss is then the cross entropy between the obtained (normalized distribution) and the correct distribution (point mass concentrated at the correct label), given by:

$$L_s(a, l) = l^p \cdot \log\left(\frac{1}{a^p}\right) + l^n \cdot \log\left(\frac{1}{a^n}\right)$$

The neural network thus produces an output for each keyword. The neural network's outputs are $u=u_1^p, u_1^n, u_2^p, u_2^n \ldots, u_z^p, u_z^n$) where $u_i^p, u_i^n$ relate to the un-normalized probability of the keyword i being applicable or not applicable to the text t, respectively. $l_i^p, l_i^n$ denotes the ground-truth label for the text (i.e. if the keyword i is indeed applicable to the text then $l_i^p=1$ and $l_i^n=0$ and if the keyword i is not applicable to the text then $l_i^p=0$ and n $l_i^n=1$. The set of all labels for all keywords is denoted by $(l=l_1^p, l_1^n, l_2^p, l_2^n, \ldots, l_z^p, l_z^n)$. The loss function that sums the Softmax cross-entropy losses is used for each keyword:

$$L_s(u, l) = \sum_{i=1}^{r} \left( l_i^p \cdot \log\left(\frac{1}{a_i^p}\right) + l_i^n \cdot \log\left(\frac{1}{a_i^n}\right) \right) + \lambda \|\Theta\|^2$$

where $\lambda \|\Theta\|^2$ is an $L_2$ regularization of the network weights with the constant $\lambda$ controlling the degree of regularization.

The processes described above are implemented by computer programs. The computer programs comprise computer program code. The computer programs are stored on one or more computer readable storage media and may be located in one or more physical locations. Elements that are now illustrated as software can be changed to equivalent hardware elements and vice versa.

The computer programs may be implemented in any one or more of a number of computer programming languages and/or deep learning frameworks, for example Pytorch, TensorFlow, Theano, DL4J. When run on one or more processors, the computer programs are configured to enable the functionality described herein.

Figure 7:
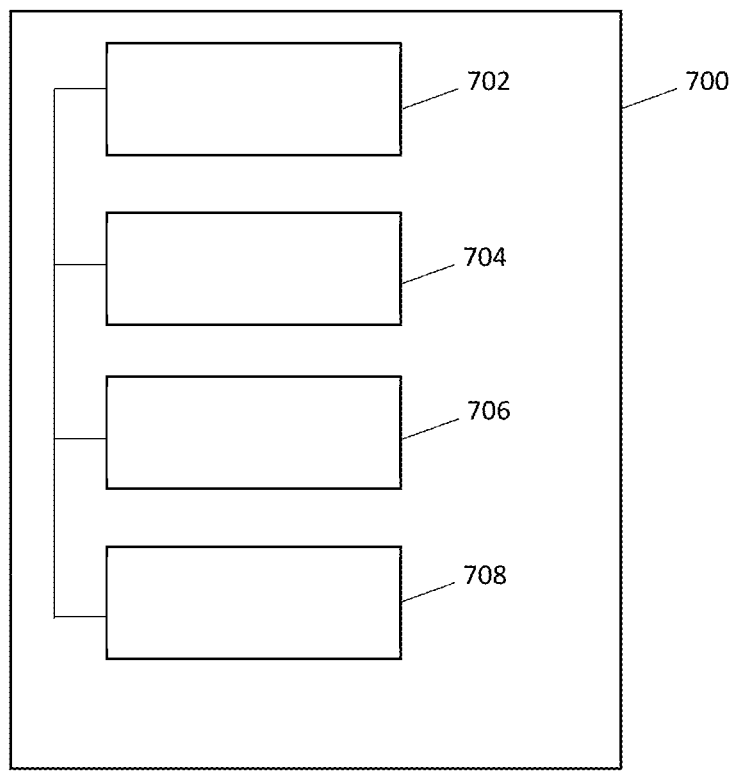
FIG. 7 is a diagram of an exemplary computer system on which embodiments of the invention may be carried out.

As will be apparent to a person skilled in the art, the processes described herein may be carried out by executing suitable computer program code on any computing device suitable for executing such code and meeting suitable minimum processing and memory requirements. For example, the computing device may be a server or a personal computer. Some components of such a computing device are now described with reference to FIG. 7. In practice such a computing device will have a great number of components. The computer system 700 comprises a processor 702, computer readable storage media 704 and input/output interfaces 706, all operatively interconnected with one or more busses. The computer system 700 may include a plurality of processors or a plurality of computer readable storage media 704, operatively connected.

The processor 702 may be a conventional central processing unit (CPU). The processor 702 may be a CPU augmented by a graphical processing unit (GPU) to speed up training. Tensor processing units may also be used. The computer readable storage media 704 may comprise volatile and non-volatile, removable and non-removable media. Examples of such media include ROM, RAM, EEPROM, flash memory or other solid state memory technology, optical storage media, or any other media that can be used to store the desired information including the computer program code and to which the processor 702 has access.

As an alternative to being implemented in software, the computer programs may be implemented in hardware, for example special purpose logic circuitry such as field programmable gate array or an application specific integrated circuit. Alternatively, the computer programs may be implemented in a combination of hardware and software.

The input/out interfaces 708 allow coupling of input/output devices, such as a keyboard, a pointer device, a display, et cetera.

It will be appreciated by persons skilled in the art that various modifications are possible to the embodiments.

In the specification the term "comprising" shall be construed to mean that features and/or steps are included, but do not necessarily consist exclusively of, unless the context dictates otherwise. This definition also applies to variations on the term "comprising" such as "comprise" and "comprises".

The applicant hereby discloses in isolation each individual feature or step described herein and any combination of two or more such features, to the extent that such features or steps or combinations of features and/or steps are capable of being carried out based on the present specification as a whole in the light of the common general knowledge of a person skilled in the art, irrespective of whether such features or steps or combinations of features and/or steps solve any problems disclosed herein, and without limitation to the scope of the claims. The applicant indicates that aspects of the present invention may consist of any such individual feature or step or combination of features and/or steps. In view of the foregoing description it will be evident to a person skilled in the art that various modifications may be made within the scope of the invention.

The invention claimed is:

1. A computer-implemented method of tagging a text, comprising:
   determining a value for each of a plurality of locations in a first vector, wherein each of the locations corresponds to a respective predetermined word, each location value relates to relevance of the respective predetermined word in the text, and a number of words is between 600 and 20000;
   processing, by a trained first neural network encoder component, the first vector to generate a second vector, wherein a number of locations in the second vector is fewer than the number of locations in the first vector and is from 100 to 5000;
   processing, at a trained second neural network decoder component, the second vector to generate at least ten probability scores, each probability score being indicative of whether a respective predetermined tag is applicable to the text;
   determining if each probability score meets a criterion;
   assigning the predetermined tag corresponding to each probability score to the text dependent at least on the probability score for the respective predetermined tag meeting the criterion.

2. The method of claim 1, wherein the relevance of each of the words in the text relates to existence and/or frequency of the respective predetermined word in the text.

3. The method of claim 1, wherein determining the value for each location in the first vector is based on frequency of the predetermined word and a total number of words in the text.

4. The method of claim 1, wherein the predetermined words comprise words used in related texts in a same field as the text to be tagged, wherein the predetermined words are the most frequent words in the related texts in the same field.

5. The method of claim 1, wherein the number of tags for which the probability score is determined is at least 20.

6. The method of claim 1, wherein the number of locations in the first vector is between 2000 and 5000.

7. The method of claim 1, wherein the first and second neural network components each comprise an input layer, an output layer, and one or more hidden layers between the input layer and output layer.

8. The method of claim 7, wherein one, more or all of the input layer, the output layer, and the one or more hidden layers comprise a feedforward layer.

9. The method of claim 7, wherein one, more or all of the input layer, the output layer, and the one or more hidden layers comprise a recurrent neural network (RNN) component or layer.

10. The method of claim 1, wherein the criterion is whether the probability score meets a threshold, and wherein the threshold for a first one of the tags is different from the threshold for a second one of the tags.

11. A computer program product comprising computer program code, stored on a computer readable storage means, which, when run on a processing unit, causes the processing unit to:
   determine a value for each of a plurality of locations in a first vector, wherein each of the locations corresponds to a respective predetermined word, each value relates to relevance of the respective predetermined word in the text, and a number of words is between 600 and 20000; processing, by a trained first neural network encoder component, the first vector to generate a second vector, wherein a number of locations in the second vector is fewer than the number of locations in the first vector and is from 100 to 5000;
   processing, at a trained second neural network decoder component, the second vector to generate at least ten probability score, each probability score being indicative of whether a respective predetermined tag is applicable to the text;
   determine if each probability score meets a criterion;
   assign the predetermined tag corresponding to each probability score to the text dependent at least on the probability score for the respective predetermined tag meeting the criterion.

12. A system for predicting tags for a text, the system comprising:
   a processing unit;
   a computer-readable storage medium having a computer program comprising code stored thereon, and operably coupled to the processing unit, wherein the processing unit, with the storage medium and the code, are configured to:
   determine a value for each of a plurality of locations in a first vector, wherein each of the locations corresponds to a respective predetermined word, each value relates to relevance of the respective predetermined word in the text, and a number of words is between 600 and 20000;
   processing, by a trained first neural network encoder component, the first vector to generate a second vector, wherein a number of locations in the second vector is fewer than the number of locations in the first vector and is from 100 to 5000;
   processing, at a trained second neural network decoder component, the second vector to generate at least ten probability scores, each probability score being indicative of whether a respective predetermined tag is applicable to the text;
   determine if each probability score meets a criterion;
   assign the predetermined tag corresponding to each probability score to the text dependent at least on the probability score for the respective predetermined tag meeting the criterion.

13. The system of claim 12, wherein determining the value for each location in the first vector is based on frequency of the predetermined word and a total number of words in the text.

14. The system of claim 12, wherein the predetermined words comprise words used in related texts in a same field as the text to be tagged, wherein the predetermined words are the most frequent words in the related texts in the same field.

15. The system of claim 12, wherein the number of tags for which the probability score is determined is at least 20.

16. The system of claim 12, wherein the number of locations in the first vector is between 2000 and 5000.

17. The system of claim 12, wherein the first and second neural network components each comprise an input layer, an output layer, and one or more hidden layers between the input layer and output layer.

18. The system of claim 17, wherein one, more or all of the input layer, the output layer and the one or more hidden layers comprise a feedforward layer.

19. The system of claim 17, wherein one, more or all of the input layer, the output layer and the one or more hidden layers comprise a recurrent neural network (RNN) component or layer.

20. The system of claim 12, wherein the criterion is whether the probability score meets a threshold, and wherein the threshold for a first one of the tags is different from the threshold for a second one of the tags.

* * * * *